(No Model.) 2 Sheets—Sheet 1.
T. R. JORDAN.
APPARATUS FOR TREATING ORES.
No. 306,019. Patented Sept. 30, 1884.
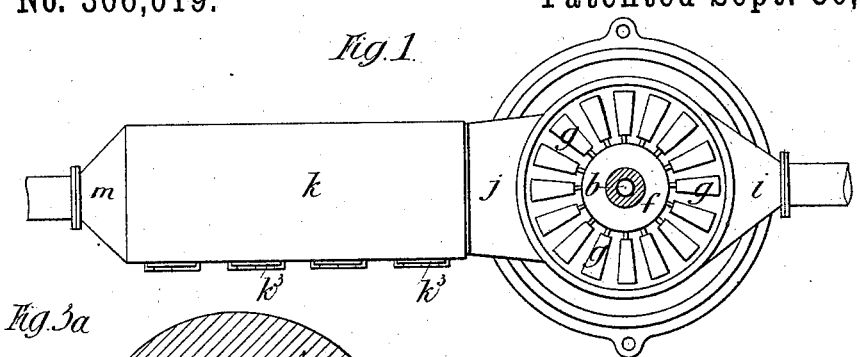
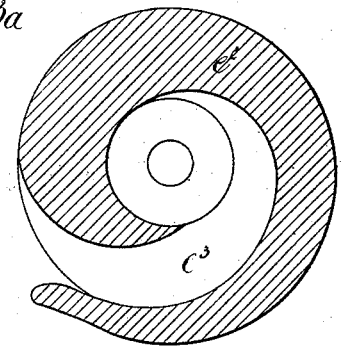
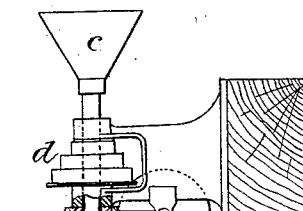
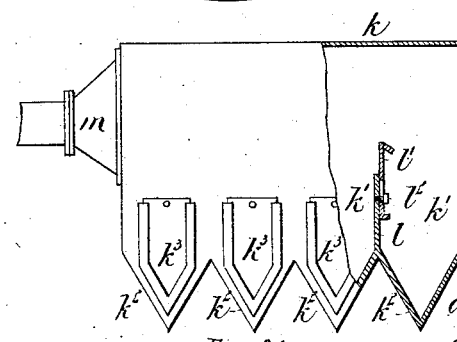
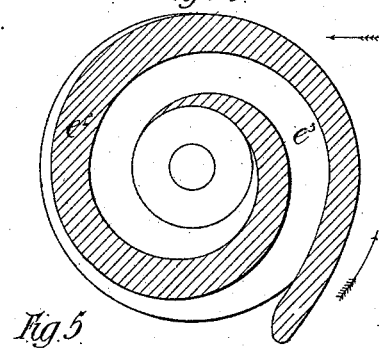
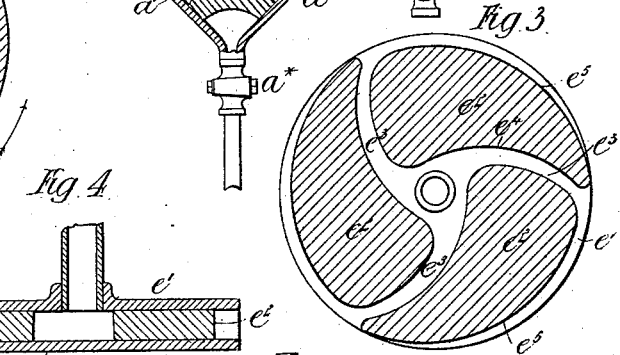
Witnesses,
Kuton Coombe
Robert Everett
Inventor
Thomas R. Jordan
By James L. Norris
Atty.

(No Model.) 2 Sheets—Sheet 2.
T. R. JORDAN.
APPARATUS FOR TREATING ORES.
No. 306,019. Patented Sept. 30, 1884.
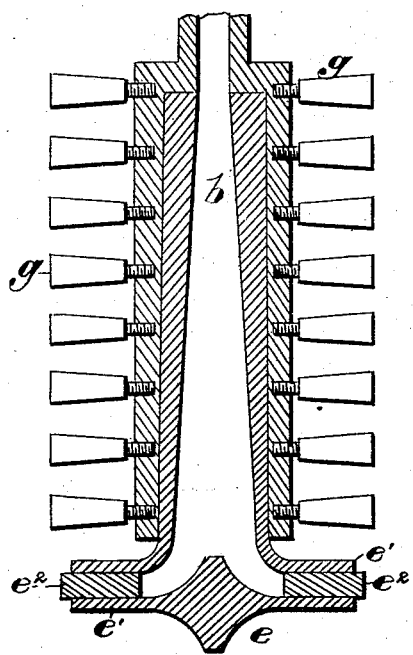
Fig. 2ª
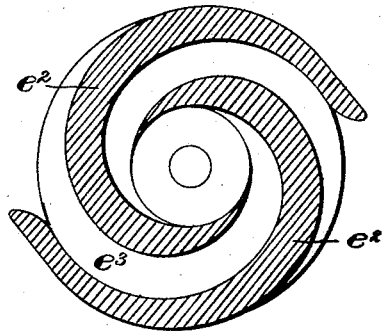
Fig. 3ᶜ
Witnesses,
Robert Everett,
Vinton Coombs
Inventor:
Thomas R. Jordan,
By James L. Norris.
Atty.

UNITED STATES PATENT OFFICE.

THOMAS ROWLAND JORDAN, OF LONDON, ENGLAND.

APPARATUS FOR TREATING ORES.

SPECIFICATION forming part of Letters Patent No. 306,019, dated September 30, 1884.

Application filed December 26, 1883. (No model.) Patented in England November 5, 1883, No. 5,235.

*To all whom it may concern:*

Be it known that I, THOMAS ROWLAND JORDAN, a subject of the Queen of Great Britain, residing at London, England, engineer, have invented Improvements in Machinery or Apparatus for Treating Ores, chiefly for the extraction of precious metal therefrom, (for which I have applied for provisional protection in Great Britain on the 5th day of November, 1883, No. 5,235,) of which the following is a specification, reference being had to the accompanying drawings.

My invention relates to improvements in machinery or apparatus for passing ores containing gold or silver in a finely-divided condition through mercury or other material for the purpose of separating the precious metals from such ores by amalgamation, and for concentrating the residue of such ores or similar materials.

The special construction of this machinery or apparatus for passing the ore-sand through mercury or other material is designed with a view to introduce the ore-sand under a head of the amalgamating fluid, and to retain the particles in a finely-divided condition in or under the same during any length of time necessary to effect the amalgamation of all the gold or silver contained in the sand, and, further, to recover from the tailings passing from the said machine the "sickened" mercury or other valuable metallic substance which may be contained therein.

Figure 1 is a plan of the apparatus; Fig. 2, a central vertical section; Fig. $2^a$, a central vertical section through the tube and its drum, showing a modification which may be the preferred form; Fig. 3, a horizontal section of the ore-injector on an enlarged scale. Figs. $3^a$, $3^b$, and $3^c$ are modifications of the injector; Fig. 4, a vertical section through Fig. 3; Fig. 5, a further modification of the injector.

According to one form or modification the said machinery or apparatus is constructed as shown in Figs. 1 and 2, of which Fig. 1 is a plan or top view, and Fig. 2 a central vertical section, partly in elevation.

The machine shown in these figures has a circular pan, $a$, of any required dimensions. This pan is constructed with a conical bottom, $a'$, and a cover, $a^2$, and preferably provided with a steam-jacket, $a^3$. In this pan $a$, I arrange a vertical tube, $b$, provided with a hopper, $c$, at its upper end, the said tube being provided with cone-pulleys $d$, or other means, whereby it may be revolved at any required speed. To the lower end of this tube $b$, which is under the required depth or head of mercury, I attach a device, $e$, which I term an "injector," and which revolves with the said tube. The construction of this injector is peculiar, and is illustrated in Figs. 3 and 4, of which Fig. 3 is a horizontal section, and Fig. 4 a vertical central section, both drawn to an enlarged scale. It comprises two circular plates or disks, $e'$, kept apart by blocks $e^2$ of wood or metal. These blocks are so arranged and curved from the center to the periphery of the said disks as to form one or more passages, $e^3$, which extend from the aperture at the lower end of the vertical pipe $b$ to the exterior of the injector.

In Fig. $2^a$, which is a central section, I have shown a modification wherein I use a conical tube or pipe for the introduction of the sand into the amalgamating fluid or agent. I sometimes use an agitator arranged in any suitable manner to be rotated within the said tube, to prevent the clogging of the ore-sand therein.

I in some instances modify the said injector by constructing it without the bottom disk, and making the aforesaid blocks from two to three inches deep at the side marked $e^4$, and inclined to a feather-edge at the side marked $e^5$, the curved form of these blocks and the passages between them being retained, as above described. This modification of the injector is shown in vertical central section in Fig. 5. Further modifications are shown in horizontal section in Figs. $3^a$, $3^b$, $3^c$, all these figures being also drawn to an enlarged scale.

The portion of the vertical tube $b$ immersed in the mercury (the level of which is shown by a dotted line in Fig. 2) is surrounded by a drum, $f$, to which I attach blades, vanes, or wings $g$. These blades $g$ project from the drum into the mercury and extend nearly to the inner cylindrical surface of the pan $a$, as shown. Provision is made for setting them at any required angle.

A pulley, $h$, a worm, $h'$, and a worm-wheel, $h^2$, or other suitable means are provided for rotating the said drum and blades slowly in the reverse direction to that in which the vertical tube $b$ rotates.

At the upper part of the pan $a$, and in such a position as to be near and above the surface of the mercury, (when the pan is properly filled therewith,) I provide a pipe, $i$, the mouth or orifice of which is flat and narrow. On the opposite side of the pan and in the same horizontal plane, or nearly so, I arrange an outlet pipe or passage, $j$, leading to a concentrating-chamber, $k$. This part of the apparatus is constructed of wrought-iron or other suitable material, and is divided at its lower portion into two or more compartments, $k'$, by vertical partitions. These partitions are each composed of a fixed plate, $l$, and adjustable plate $l'$, the latter plate being secured by bolts $l^2$, passing through slots therein. Each compartment has a conical bottom, $k^2$, and a sliding door, $k^3$. A waste-pipe, $m$, is introduced at the top of the said chamber, opposite the pipe or passage $j$, whereby the material enters from the pan $a$.

In using the above-described machine the ore-sand is fed into the hopper $c$ at the top of the central revolving tube, $b$, and, passing down this tube to the injector $e$, is centrifugally forced into the mercury, in which a space is created to receive it by the peculiar form and action of the aforesaid injector. When entering the mercury, the immediate tendency of the ore-sand is to rise rapidly to the surface thereof, and thus to escape too quickly for the precious metal to be properly extracted by amalgamation. This premature escape is, however, prevented by the aforesaid revolving blades $g$, which regulate the time of the retention of the ore in the mercury. These blades can be varied or adjusted in respect of their number, their angle, or their velocity to suit different qualities of ore.

The sand on reaching the surface of the mercury in the pan encounters a blast from the aforesaid air-supply pipe $i$. This blast blows the sand through the pipe or passage $j$ and across the compartments of the concentrating-chamber. The particles of sand fall into the different compartments of the said chamber, according to their specific gravity, the light waste being conveyed by the air-current to the waste-pipe $m$, which is suitably arranged to conduct it away from the concentrating-chamber.

The amalgam formed in the pan $a$ settles in the conical bottom $a'$ thereof, and is drawn off at convenient intervals through a valve or cock, $a^*$, or other means provided for this purpose. A pipe, $a^4$, is provided for drawing off the liquid mercury or other amalgamating agent when desired.

I have found that the proportion of precious metal extracted from refractory ores is governed in a great measure by the depth or head and consequent pressure of mercury, and the amount of distribution and separation to which the ore-sand is subjected. Therefore, in order that the ore-sand shall, while retarded and distributed or separated by the revolving blades, vanes, or wings $g$, be subjected to the requisite pressure, I make my amalgamating-pan of such form and dimensions that the requisite head or depth and pressure of mercury may be employed. I have found by experiment that the head or depth of mercury should for this purpose be from about three to four feet.

With the feed-pipes ordinarily employed, which have a parallel bore, the sand requires to be fed into the mercury mixed with water, or in a moist state, and even then cannot be injected under the head or depth of mercury requisite to effect amalgamation; but by the employment of my conical feed-pipe and the injector above described I am enabled to feed the ore-sand in a dry state into the mercury under the required head or depth thereof.

Having thus described my invention, what I claim is—

1. In an amalgamator, the combination of a conical feed-pipe and an injector for feeding or injecting dry ore-sand under the requisite head and pressure of mercury, a cylinder or drum carrying blades, vanes, or wings arranged immediately above the exit from the injector, for preventing the too rapid ascent of sand, and for separating or distributing the particles thereof, and a pan in which the said conical feed-pipe and injector and the said cylinder or drum are arranged to be rotated at different velocities, the said pan permitting the employment of the requisite pressure of mercury to effect the amalgamation, substantially as described.

2. In an amalgamator, the combination, with an amalgamating-vessel and concentrating-chamber or separator, of an air-blast injector arranged at the top of said amalgamating-vessel, for producing an air-blast over the surface of the mercury to convey the tailings from the said pan through the said concentrating-chamber or separator, substantially as described.

3. The combination of the pan $a$, provided with a jacket, $a^3$, and tapering bottom $a'$, the tube $b$, provided with a hopper, $c$, at its upper end, and an injector, $e$, at its lower end, and formed with an opening in its side, a drum, $f$, around the tube, provided with wings $g$, a concentrator, $k$, communicating with the upper part of pan $a$, and an air-blast tube, $i$, opening into the upper part of the pan opposite to the communication of the concentrator therewith, substantially as described.

In testimony whereof I have hereunto signed my name in the presence of two subscribing witnesses.

THOMAS ROWLAND JORDAN.

Witnesses:
JOHN DEAN,
T. J. OSMAN,
*Both of No. 17 Gracechurch Street, London.*